United States Patent
Chen

(10) Patent No.: US 10,521,157 B2
(45) Date of Patent: Dec. 31, 2019

(54) JUMP PAGE CACHE READ METHOD IN NAND FLASH MEMORY AND NAND FLASH MEMORY

(71) Applicants: GIGADEVICE SEMICONDUCTOR (SHANGHAI) INC., Shanghai (CN); GIGADEVICE SEMICONDUCTOR (BEIJING) INC., Beijing (CN); GIGADEVICE SEMICONDUCTOR (HEFEI) INC., Hefei (CN)

(72) Inventor: Minyi Chen, San Jose, CA (US)

(73) Assignees: GigaDevice Semiconductor (Shanghai) Inc., Shanghai (CN); GigaDevice Semiconductor (Beijing) Inc., Beijing (CN); GigaDevice Semiconductor (Hefei) Inc., Hefei (CN)

( * ) Notice: Subject to any disclaimer, the term of this patent is extended or adjusted under 35 U.S.C. 154(b) by 0 days.

(21) Appl. No.: 15/871,142

(22) Filed: Jan. 15, 2018

(65) Prior Publication Data

US 2019/0220226 A1 Jul. 18, 2019

(51) Int. Cl.
*G06F 3/06* (2006.01)
*G06F 12/0893* (2016.01)

(52) U.S. Cl.
CPC ............ *G06F 3/0659* (2013.01); *G06F 3/061* (2013.01); *G06F 3/0619* (2013.01); *G06F 3/0679* (2013.01); *G06F 12/0893* (2013.01); *G06F 2212/1016* (2013.01); *G06F 2212/1032* (2013.01); *G06F 2212/2022* (2013.01)

(58) Field of Classification Search
CPC ........... G06F 12/0868; G06F 2212/202; G06F 2212/2022; G06F 3/0611; G06F 5/10; G06F 3/061; G06F 3/0679; G06F 3/0659; G06F 3/0619; G06F 2212/1016
USPC ........................................................ 711/103
See application file for complete search history.

(56) References Cited

U.S. PATENT DOCUMENTS

| | | | |
|---|---|---|---|
| 7,437,526 B2 * | 10/2008 | Kusakabe | G06F 3/08 711/103 |
| 2006/0179211 A1 * | 8/2006 | Aasheim | G06F 3/0619 711/103 |
| 2013/0080858 A1 * | 3/2013 | Lee | G11C 16/26 714/773 |
| 2017/0185353 A1 * | 6/2017 | Intrater | G06F 12/00 |
| 2017/0308463 A1 * | 10/2017 | Chang | G11C 16/08 |

\* cited by examiner

*Primary Examiner* — Hashem Farrokh
(74) *Attorney, Agent, or Firm* — Gokalp Bayramoglu

(57) ABSTRACT

A NAND flash memory including a control unit which includes a signal receiving circuit and a flash array; the signal receiving circuit is used to receive a cache read command from an external NAND controller; the flash array includes at least one chip, each chip includes at least one plane, each plane includes a plurality of blocks, each block includes a plurality of pages; when a cache read command is received, it reads pages in a first block according to an address of the page until reaching the last page in the first block; when the last page in the first block is reached, an address of a next to-be-read page is generated according to an address of the last page in the first block to allow the cache read command to read the next to-be-read page.

10 Claims, 3 Drawing Sheets

JUMP PAGE CACHE READ METHOD IN NAND FLASH MEMORY AND NAND FLASH MEMORY

TECHNICAL FIELD

The present application generally relates to the NAND flash memory technical field and, more particularly, to a jump page cache read method in NAND flash memory and a NAND flash memory thereof.

BACKGROUND OF THE INVENTION

Flash memory is an electronic (solid-state) non-volatile computer storage medium that can be electrically erased and reprogrammed. The NAND flash memory is a main type of flash memory named after the NAND logic gates, it has advantages of fast programming and short erasing time.

FIG. 1 is a schematic diagram showing the composition of a multi-chip package flash array. As a skilled person in the art should understand, several bitlines form a page 10, a plurality of pages form a block 20. A flash memory includes a plurality of blocks. A plane 30 is a storage array which includes a plurality of blocks 20. A chip 40 is formed of several planes 30, and several chips form a package.

As shown in FIG. 2, the NAND flash memory further includes a cache register 60 and a page register 70 for data communication with an external host 50. To obtain a higher degree of performance read operations, the NAND flash memory's cache register 60 and data register 70 can be used independent of each other. Data can be read out from the cache register 60, while array data is transferred from the pages 10 to the data register 70.

The ONFI standard supports a cache read mode of the NAND flash memory. The cache read mode starts with issuing a page read command (00h-30h) to transfer a page of data from NAND flash array to the page register. RY#BY signal will go low during data transfer indicating a busy status. Copying the next page of data from the NAND flash array to the data register while making the cache register page data available is done by issuing either a sequential cache read (31h) or random cache read (00h-31h) command. The sequential cache read mode will copy the next page of data in sequence from the NAND flash array to the data register or use the random cache read mode (00h-31h) to copy a random page of data from the NAND flash array to the data register. The RY#BY signal goes low for a period of tRCBSY during the page data transfer from the NAND flash array to the data register. When RY#BY goes high, this means the cache register is available and can be read out of the cache register by toggling #RE, which starts at address column 0.

At this point in the procedure when completing the read of the desired number of bytes, one or two things can be chosen. Continue cache read (31h or 00h-31h) operations or end the cache read mode with a last address cache read (3Fh) command.

To continue with the read operations, execute the cache read mode (31h or 00h-31h) command. The RY#BY signal goes low for a period of tRCBSY during the page data transfer from the NAND flash array to the data register and the next page of data starts being copied from the NAND flash array to the data register. When RY#BY goes high, this means the cache register is available and can be read out of the cache register by toggling #RE, which starts at address column 0.

To terminate the cache read operations at the last address cache read (3Fh) command is issued. The RY#BY signal goes low and the data register content is copied to the cache register. At the completion of the data register to cache register transfer, RY#BY goes high indicating data is available at the output of the cache register. At this point the data can be read by toggling RE# starting at column address 0 or using the random data output command for random column address access. The NAND flash array is ready for next command set.

The sequential cache read (31h) copies the next page of data in sequence with blocks to the data register while the previous page of data in the cache register is available for output. This is done by issuing the command (31h), RY#BY signal goes low and the status register bits 6 and 5="00" for the period of tRCBSY. When the RY#BY signal goes high and the status register bits 6 and 5="10", data at the cache register is available. The data can be read of from the cache register by toggling #RE, starting address is column 0 or by using the random data output command for random column address access.

The last address cache read (3Fh) copies a page of data from the data register to cache register without starting another cache read. After writing the 3Fh command, RY#BY signal goes low and the status register bits 6 and 5="00" for the period of tRCBSY. When the RY#BY signal goes high and the status register bits 6 and 5="11" the cache register data is available and the device NAND flash array is in ready state. The data can read out from the cache register by toggling #RE, starting address is column 0.

With reference to FIG. 3, which is a schematic diagram showing the operation of cache read command in the conventional technology. Based on the above principles, it is obvious that the ONFI cache read command in the conventional technology may automatically read the next page until reaching the last page of the block (shown as the top page in FIG. 3). That is, the cache read operation stops at the last page of block.

However, in some situation, when it is required to read blocks, planes, chips of the package for many times, such as 1000,000 times, stopping in the last page of each block may cause read disturb, which affects correction of the data stored in the last page.

SUMMARY OF THE INVENTION

As an improvement, there is provided a jump page cache read method in NAND flash memory and a NAND flash memory thereof, which may overcome or at least partially solve or mitigate above problems.

According to an aspect of the invention, there is provided a NAND flash memory comprising: a control unit which includes a signal receiving circuit and a flash array; the signal receiving circuit is used to receive a cache read command from an external NAND controller; the flash array includes at least one chip, each chip includes at least one plane, each plane includes a plurality of blocks, each block includes a plurality of pages; when a cache read command is received, it reads pages in a first block according to an address of the page until reaching the last page in the first block; when the last page in the first block is reached, an address of a next to-be-read page is generated according to an address of the last page in the first block, to allow the cache read command to read the next to-be-read page.

In an alternative embodiment, the next to-be-read page is the first page within the first block.

In an alternative embodiment, after the blocks in a plane are read, the next to-be-read page is the first page in the first block.

In an alternative embodiment, the NAND flash memory includes a plurality of planes, and after the blocks in a first plane are read, the next to-be-read page is the first page in the first block of a second plane.

In an alternative embodiment, after the blocks in all the planes are read, the next to-be-read page is the first page in the first block of the first plane.

In an alternative embodiment, the NAND flash memory includes a plurality of chips, and after the blocks in a first chip are read, the next to-be-read page is the first page in the first block of a first plane in a second chip.

In an alternative embodiment, after the blocks in all the chips are read, the next to-be-read page is the first page in the first block of the first plane of the first chip.

According to another aspect, there is provided a jump page cache read method in the NAND flash memory according to claim 1, comprising: receiving a cache read command from an external NAND controller; reading pages of the NAND flash memory according to the cache read command until a last page of a first block is reached; generating an address of a next to-be-read page according to an address of the last page of the first block to allow the cache read command to read the next to-be-read page.

In an alternative embodiment, the next to-be-read page is the first page within the first block. In an alternative embodiment, after the blocks in a plane are read, the next to-be-read page is the first page in the first block.

In an alternative embodiment, the NAND flash memory includes a plurality of planes, and after the blocks in a first plane are read, the next to-be-read page is the first page in the first block of a second plane.

In an alternative embodiment, after the blocks in all the planes are read, the next to-be-read page is the first page in the first block of the first plane.

In an alternative embodiment, the NAND flash memory includes a plurality of chips, and after the blocks in a first chip are read, the next to-be-read page is the first page in the first block of a first plane in a second chip.

In an alternative embodiment, after the blocks in all the chips are read, the next to-be-read page is the first page in the first block of the first plane of the first chip.

The technical solution in the embodiments may be used in various situations. For example, as discussed above, when it is required to read all the blocks, planes, chips of the package, according to the embodiment of the present invention, the cache read command will not stop in the last page of each block, which avoids the read disturb of the last page, saves the waiting time for another cache read command from the external NAND controller, and improves the efficiency.

The above description is merely an overview of technical solutions of the present application. In order to more clearly understand the technical solutions of the present application to implement in accordance with the contents of the description, and to make the foregoing and other objects, features and advantages of the application more apparent, detailed embodiments of the application will be provided below.

BRIEF DESCRIPTION OF THE DRAWINGS

Through reading the detailed description of the following preferred embodiments, various other advantages and benefits will become apparent to those of ordinary skills in the art. Accompanying drawings are merely included for the purpose of illustrating the preferred embodiments and should not be considered as limiting of the application. Further, throughout the drawings, like elements are indicated by like reference numbers.

DETAILED DESCRIPTION OF THE INVENTION

Exemplary embodiments of the present application will be described in detail with reference to the accompanying drawings hereinafter.

As a skilled person in the art should understand, in the conventional technology, after ONFI standard non-cache read command sequence (00h+5-byte address+30h) completes and issue the cache read command 31h, it will automatically jump to the next page address until the end of a block. An external NAND controller (such as a host) may first send the sequential cache read command 31h to the NAND flash memory. Then, the NAND flash memory performs a cache read operation page after page. When the last page in the current block is reached, the cache read command 31h stops jumping to next page address since no new page address is not provided. As a result, it stays in the current page.

Figure 4:
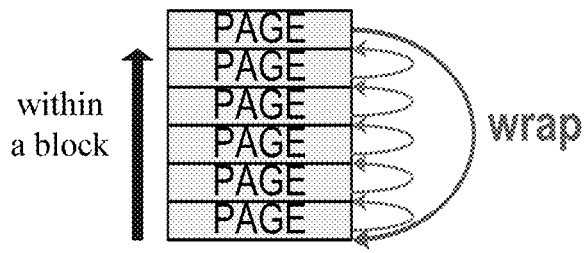
FIG. 4 is a schematic diagram showing a jump function according to a first embodiment of the invention, wherein the wrap function is limited within a block.

Compared with the conventional technology, the present invention provides a jumping function of cache read command 31h. FIG. 4 is a schematic diagram showing a wrap function according to a first embodiment of the invention. In the embodiment shown in FIG. 4, the wrap function is limited within a block.

In the conventional technology, when the cache read command 31h is issued from the external NAND controller, it performs cache read in the first page of the block inside the NAND flash memory according to the address of the first page. After the cache in the first page is read, the address of the second page is provided from the NAND flash memory, and then the cache read command jumps to the second page according to the address of the second page.

When reaching the last page, the cache read command reads the last page and then jumps to read the first page in within the block according to the address of the first page provided by the NAND flash memory.

Figure 1:
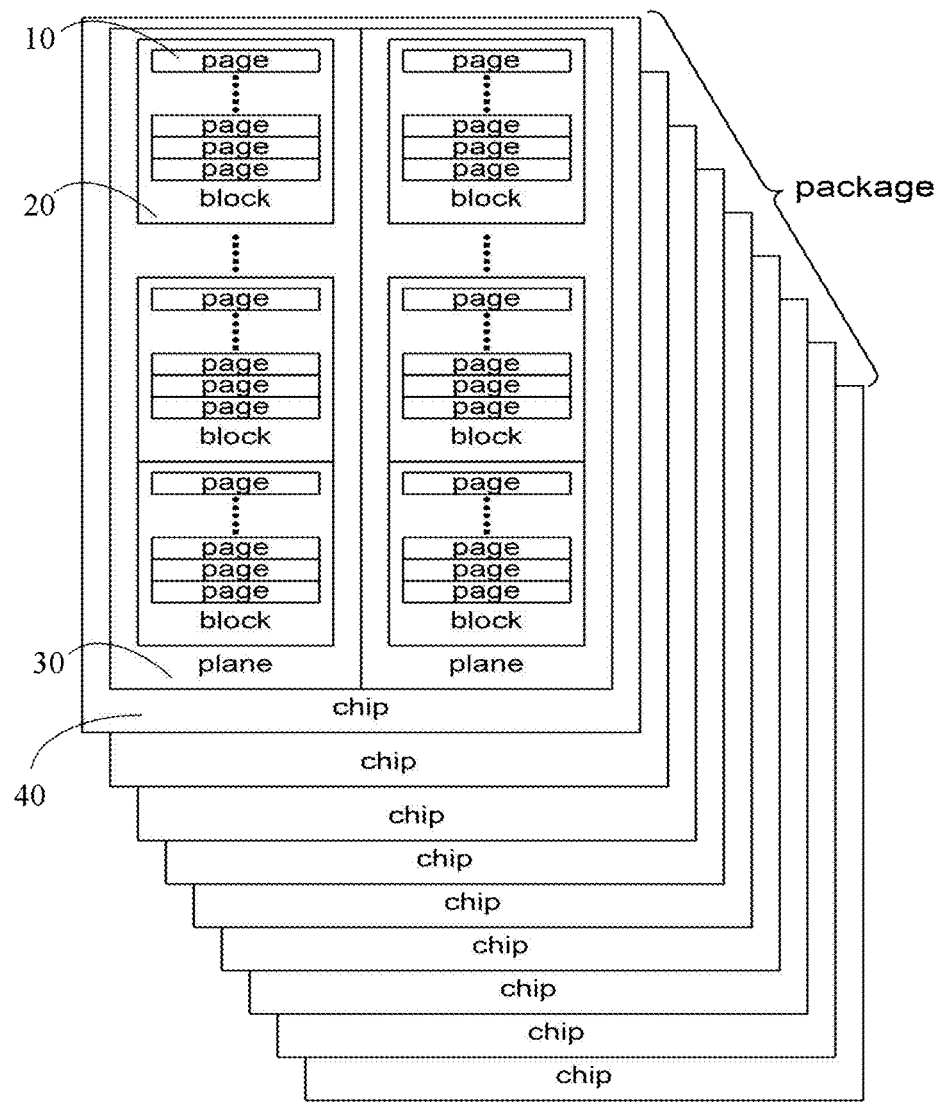
FIG. 1 is a schematic diagram showing the composition of a package.
Figure 2:
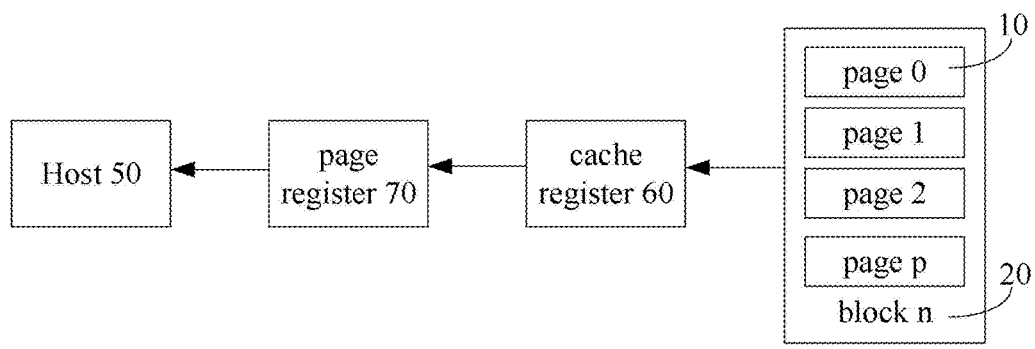
FIG. 2 is a schematic diagram showing the data communication between the NAND flash array, the data register, the cache register and the host.
Figure 3:
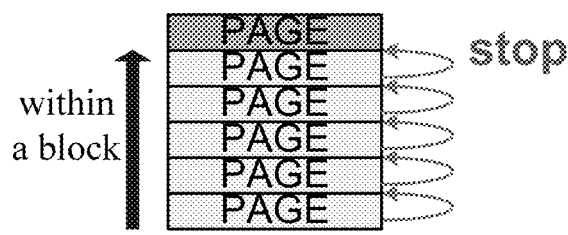
FIG. 3 is a schematic diagram showing the operation of cache read command in the conventional technology.

The NAND flash memory may include a control unit and a flash array. The control unit may include a signal receiving unit. In the first embodiment, Before issuing the cache read command 31h, the external NAND controller may issue a normal non-cache read 30h which has the format of "00h+5-byte address+30h" to the NAND flash memory. After read operation, the external NAND controller may issue the cache read command 31h for the next address, which is based on the non-cache read address above. When the NAND flash memory receives the cache read command 31h by the signal receiving unit from the external NAND controller (such as the host 50 in FIG. 2), it may jump to the next address to perform cache read.

Figure 5:
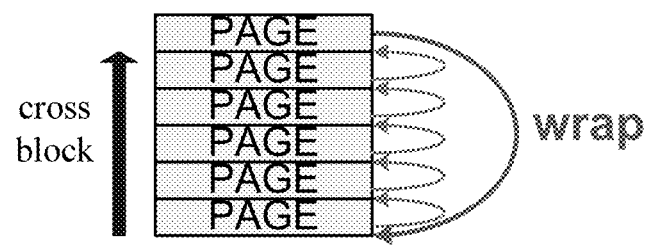
FIG. 5 is a schematic diagram showing a jump function according to a third embodiment of the invention, wherein the wrap function is limited within a plane.

In the second embodiment, as shown in FIG. 5, in another embodiment of the present invention, the next page is jumped to, even if the next page is not in the same block with the current last page. For example, when the cache read command 31h finishes reading the last page in the first block, it may jump to the address of the first page in the neighborhood second block. Then the cache read command jumps to the first page in the second block to perform cache read operation. Furthermore, as shown in FIG. 5, after reading the last page of the last block, in the embodiment, the first page of the first block is jumped to according to the address of the first page in the first block, which achieves a wrap function of cache read command among blocks.

Figure 6:
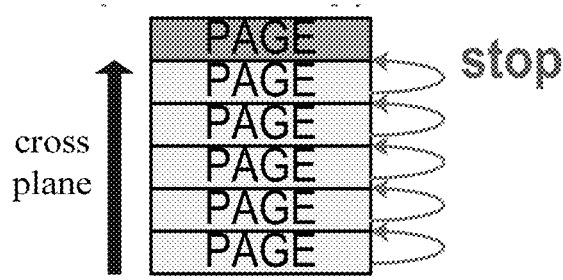
FIG. 6 is a schematic diagram showing a jump function according to a fourth embodiment of the invention, wherein the wrap function is limited within a chip.

In the third embodiment, as shown in FIG. 6, in another embodiment of the present invention, the next page is jumped to, even if the next page is not in the same plane with the current last page. For example, when the cache read command 31h finishes reading the last page in the first plane, it may jump to the address of the first page in the neighborhood second plane. Then the cache read command jumps to the first page in the second plane to perform cache read operation.

Figure 7:
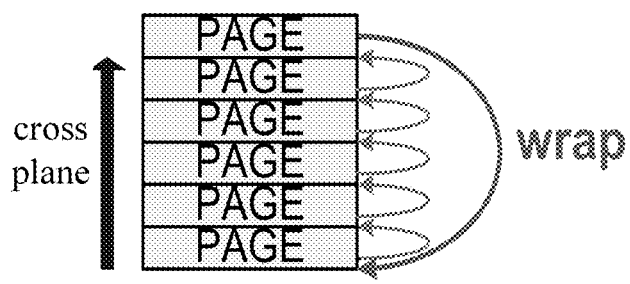
FIG. 7 is a schematic diagram showing a jump function according to a fifth embodiment of the invention, wherein the wrap function is limited within a chip.

Furthermore, as shown in FIG. 7, in the fourth embodiment, it is also capable to provide wrap function among planes. After reading the last page of the last plane, in the embodiment, the first page of the first block of the first plane is jumped to according to the address of the first page in the first block of the first plane, which achieves a wrap function of cache read command among planes.

Figure 8:
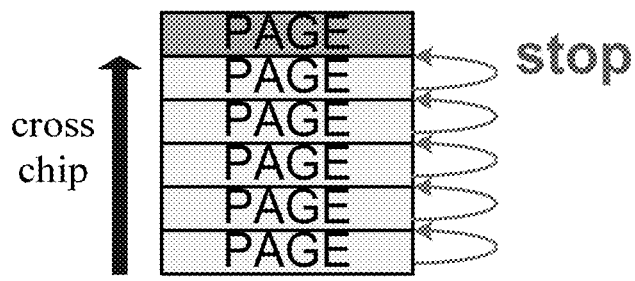
FIG. 8 is a schematic diagram showing a jump function according to a sixth embodiment of the invention, wherein the wrap function is limited within a multi-chip package.

The present invention may be used in a multi-chip package. In the fifth embodiment, as shown in FIG. 8, the next page is jumped to, even if the next page is not in the same chip with the current last page. For example, when the cache read command 31h finishes reading the last page in the first chip, it may jump to the address of the first page in the neighborhood second chip. Then the cache read command jumps to the first page in the second chip to perform cache read operation.

Figure 9:
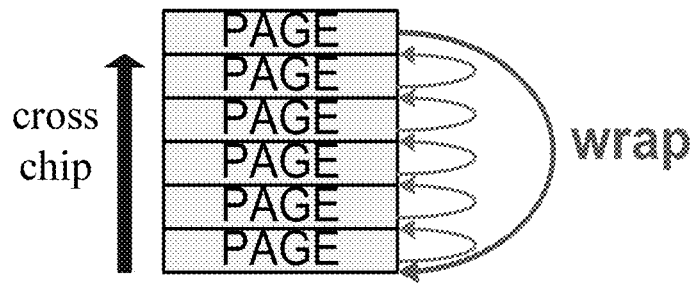
FIG. 9 is a schematic diagram showing a jump function according to a seventh embodiment of the invention, wherein the wrap function is limited within a multi-chip package.

Furthermore, as shown in FIG. 9, in the sixth embodiment, it is also capable to provide wrap function among chips. After reading the last page of the last chip, in the embodiment, the first page of the first block of the first plane of the first chip is jumped to according to the address of the first page in the first chip, which achieves a wrap function of cache read command among planes.

The technical solution in the embodiments may be used in various situations. For example, as discussed above, when it is required to read blocks, planes, chips of the package for many times, according to the embodiment of the present invention, the cache read command will not stop in the last page of each block, but jumps to the desired page, which avoids the read disturb, saves the waiting time for another cache read command from the external NAND controller, and improves the efficiency.

The "an embodiment", "embodiments" or "one or more embodiments" mentioned in the disclosure means that the specific features, structures or performances described in combination with the embodiment(s) would be included in at least one embodiment of the present application. Moreover, it should be noted that, the wording "in an embodiment" herein may not necessarily refer to the same embodiment.

Many details are discussed in the specification provided herein. However, it should be understood that the embodiments of the disclosure may be implemented without these specific details. In some examples, the well-known methods, structures and technologies are not shown in detail so as to avoid an unclear understanding of the description.

It should be noted that the above-described embodiments are intended to illustrate but not to limit the present application, and alternative embodiments may be devised by the person skilled in the art without departing from the scope of claims as appended. In the claims, any reference symbols between brackets form no limit of the claims. The wording "include" does not exclude the presence of elements or steps not listed in a claim. The wording "a" or "an" in front of an element does not exclude the presence of a plurality of such elements. The disclosure may be realized by means of hardware comprising a number of different components and by means of a suitably programmed computer. In the unit claim listing a plurality of devices, some of these devices may be embodied in the same hardware. The wordings "first", "second", and "third", etc. do not denote any order. These wordings may be interpreted as a name.

Also, it should be noticed that the language used in the present specification is chosen for the purpose of readability and teaching, rather than explaining or defining the subject matter of the present application. Therefore, it is obvious for an ordinary skilled person in the art that modifications and variations could be made without departing from the scope and spirit of the claims as appended. For the scope of the present application, the publication of the inventive disclosure is illustrative rather than restrictive, and the scope of the present application is defined by the appended claims.

What is claimed is:

1. A NAND flash memory comprising:
   a control unit, wherein the control unit includes a signal receiving circuit and a flash array;
   the signal receiving circuit is configured to receive a cache read command from an external NAND controller;
   the flash array includes a plurality of chips, each chip includes a plurality of planes, each plane includes a plurality of blocks, and each block includes a plurality of pages;
   when the cache read command reads a last page in a first plane, an address of a next to-be-read page is assigned as an address of a first page in a second plane, where the first plane and the second plane are different planes, or
   when the cache read command reads a last page in a first chip, an address of a next to-be-read page is assigned as an address of a first page in a second chip, where the first chip and the second chip are different chips.

2. The NAND flash memory according to claim 1, after the plurality of blocks in the first plane are read, the next to-be-read page is the first page in a first block in the second plane.

3. The NAND flash memory according to claim 1, wherein after the plurality of blocks in all the plurality of planes are read, the next to-be-read page is the first page in a first block of the first plane.

4. The NAND flash memory according to claim 1, after the plurality of blocks in the first chip are read, the next to-be-read page is the first page in a first block of a first plane in the second chip.

5. The NAND flash memory according to claim 1, wherein after the plurality of blocks in all the plurality of chips are read, the next to-be-read page is the first page in a first block of a first plane of the first chip.

6. A jump page cache read method in a NAND flash memory, comprising:
receiving a cache read command from an external NAND controller;
reading pages of the NAND flash memory according to the cache read command until a last page of a first plane or a first chip is reached;
generating an address of a next to-be-read page according to an address of the last page of the first plane or the first chip to allow the cache read command to read the next to-be-read page;
wherein the cache read command reads the last page in the first plane and the address of the next to-be-read page is an address of a first page in a second plane, where the first plane and the second plane are different planes,
or
wherein the cache read command reads the last page in the first chip and the address of the next to-be-read page is an address of a first page in a second chip, where the first chip and the second chip are different chips;
wherein, the NAND flash memory comprises,
a control unit, wherein the control unit includes a signal receiving circuit and a flash array;
the signal receiving circuit is configured to receive the cache read command from the external NAND controller;
the flash array includes a plurality of chips, each chip includes a plurality of planes, each plane includes a plurality of blocks, and each block includes a plurality of pages.

7. The method according to claim 6, wherein after the plurality of blocks in the first plane are read, the next to-be-read page is the first page in a first block in the second plane.

8. The method according to claim 6, wherein after the plurality of blocks in all the planes are read, the next to-be-read page is the first page in a first block of the first plane.

9. The method according to claim 6, wherein after the plurality of blocks in the first chip are read, the next to-be-read page is the first page in a first block of a first plane in the second chip.

10. The method according to claim 6, wherein after the plurality of blocks in all the chips are read, the next to-be-read page is the first page in a first block of a first plane of the first chip.

* * * * *